(12) United States Patent
Brocke et al.

(10) Patent No.: US 12,351,250 B2
(45) Date of Patent: Jul. 8, 2025

(54) AUXILIARY STEERING DEVICE FOR A HYDROSTATIC VEHICLE STEERING SYSTEM

(71) Applicant: DEERE & COMPANY, Moline, IL (US)

(72) Inventors: Stefan Brocke, Mannheim (DE); Norbert Fritz, Ilvesheim (DE); Richard Starck, Falkenstein (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/836,938

(22) PCT Filed: Jan. 16, 2023

(86) PCT No.: PCT/EP2023/050873
§ 371 (c)(1),
(2) Date: Aug. 8, 2024

(87) PCT Pub. No.: WO2023/151899
PCT Pub. Date: Aug. 17, 2023

(65) Prior Publication Data
US 2025/0136171 A1 May 1, 2025

(30) Foreign Application Priority Data
Feb. 10, 2022 (DE) .......................... 102022103106.3

(51) Int. Cl.
*B62D 5/00* (2006.01)
*B62D 5/09* (2006.01)
*B62D 6/00* (2006.01)

(52) U.S. Cl.
CPC ............. *B62D 5/003* (2013.01); *B62D 5/091* (2013.01); *B62D 6/00* (2013.01)

(58) Field of Classification Search
CPC ........ B62D 5/003; B62D 5/091; B62D 5/092; B62D 5/093; B62D 6/00
See application file for complete search history.

(56) References Cited

U.S. PATENT DOCUMENTS

2015/0246683 A1* 9/2015 Kuramochi ............ B62D 5/003
701/43

FOREIGN PATENT DOCUMENTS

| EP | 3492344 A1 | 6/2019 |
| EP | 3707057 A1 | 9/2020 |

OTHER PUBLICATIONS

The International Search Report and the Written Opinion of the International Searching Authority issued in counterpart application No. PCT/EP2023/050873, dated Apr. 5, 2023, 18 pages.

* cited by examiner

*Primary Examiner* — Timothy Hannon

(57) ABSTRACT

An auxiliary steering device for a hydrostatic vehicle steering system, includes an input shaft, which can be actuated or set in rotation by a steering wheel, an output shaft for actuating a steering metering valve, and a planetary gearing. The planetary gearing includes a planetary wheel carrier with multiple planetary wheels, which mesh with a sun gear and a surrounding ring gear. The input shaft is connected to the planetary wheel carrier and the output shaft is connected to the sun gear in each case for conjoint rotation. The auxiliary steering device has an electric drive for exerting a torque on the ring gear, a braking device for fixing the input shaft, and a coupling device for producing a rotationally fixed connection between the output shaft and the planetary wheel carrier.

12 Claims, 2 Drawing Sheets

|  | First emergency operating mode | Second emergency operating mode | Neutral operating mode | First assistance mode | Second assistance mode | Automatic mode |
|---|---|---|---|---|---|---|
| Triggering | Automatic based on detected malfunction of the auxiliary steering device | Automatic based on detected malfunction of the hydrostatic vehicle steering system | By the driver via user interface | By the driver via user interface | By the driver via user interface | By the driver via user interface |
| Braking device | Open | Open | Open | Open | Open | Closed |
| Coupling device | Engaged | Engaged | Engaged | Engaged | Disengaged | Disengaged |
| Electric drive | Drive-free state | Steering-assisting drive state | Compensation drive state | Haptic feedback in the straight-ahead position | Activation with the effect of a variable steering transmission ratio | Implementation of autonomous steering commands |

FIG. 2

AUXILIARY STEERING DEVICE FOR A HYDROSTATIC VEHICLE STEERING SYSTEM

CROSS-REFERENCE TO RELATED APPLICATIONS

This application is a National Stage of PCT Application No. PCT/EP2023/050873, filed Jan. 16, 2023, which claims the benefit of and priority to German Patent Application No. 102022103106.3, filed Feb. 10, 2022, which are hereby incorporated by reference

FIELD OF THE DISCLOSURE

The disclosure relates to an auxiliary steering device for a hydrostatic vehicle steering system.

BACKGROUND

An auxiliary steering device for a hydrostatic vehicle steering system are used, for example, in agricultural vehicles but also forestry and construction machines.

SUMMARY

In general, such vehicle steering systems comprise a steering handle in the form of a steering wheel, by which a steering metering valve in the form of an orbitrol, which is fed with pressurized hydraulic fluid from a high-pressure hydraulic pump, can be actuated in order to activate a hydraulic steering cylinder connected thereto to adjust steerable wheels of the vehicle. The function of the orbitrol is limited to setting the hydraulic flow in the direction of the hydraulic steering cylinder, whereas the hydraulic pressure, and hence the hydraulic energy, is provided by the high-pressure hydraulic pump. In this way, actuating forces that take account even of the conditions of heavy vehicles can be generated without problems. On the other hand, direct implementation of additional or auxiliary functions which require intervention in the hydrostatic vehicle steering system are possible only with comparatively high effort. This is because, as distinct from so-called electrohydraulic steering systems, there is, amongst other things, no direct mechanical passage through between steering handle and steering cylinder, which would simplify such an intervention.

There is, therefore, a need for a universally usable auxiliary steering device which, with comparatively little effort, permits the implementation of a large number of additional and auxiliary functions in conjunction with a hydrostatic vehicle steering system.

This object is achieved by an auxiliary steering device having the features of one or more of the following embodiments.

Accordingly, the auxiliary steering device for a hydrostatic vehicle steering system comprises an input shaft, which can be actuated or set in rotation by a steering handle, an output shaft for actuating a steering metering valve or orbitrol, and planetary gearing. The planetary gearing comprises a planetary wheel carrier with multiple planetary wheels, which mesh with a sun gear and a surrounding ring gear, the input shaft being connected to the planetary wheel carrier and the output shaft being connected to the sun gear, in each case for conjoint rotation. Furthermore, the auxiliary steering device has an electric drive for exerting a torque on the ring gear, a braking device for fixing the input shaft, and a coupling device for producing a rotationally fixed connection between the output shaft and the planetary wheel carrier.

Depending on the actuating state of the coupling or braking device, on the one hand, and the operating state of the electric drive, on the other hand, it is possible to implement various additional and auxiliary functions for a hydrostatic vehicle steering system without the hydrostatic vehicle steering system itself having to be modified. The auxiliary steering device according to the disclosure is additionally distinguished by a comparatively simple and therefore particularly robust construction and forms a unit that is structurally independent of the hydrostatic vehicle steering system, which makes it possible to retrofit this in existing vehicles or to offer it as an equipment variant at a higher cost. In addition, universal use in conjunction with hydrostatic vehicle steering systems of different types is also possible, that is that to say not only in those with front axle steering but also for rear axle or articulated steering.

The steering handle is typically a steering wheel, which is located in a driver's cab of the vehicle and is co-rotationally connected to the input shaft of the auxiliary steering device.

Advantageous developments of the auxiliary steering device according to the disclosure can be found in the dependent herein.

The braking device may be urged into an open position under the action of a restoring means when in the non-actuated state. The braking device for fixing the input shaft is mounted on a chassis part fixed to the vehicle or else on a fixing structure of the auxiliary steering device which, in turn, is used for attachment to a chassis part fixed to the vehicle. The actuation of the braking device, for example, a brake calliper for gripping a brake disk co-rotationally connected to the input shaft, is carried out, for example, by an electromagnetic actuator. The braking device assumes its open position under the action of the restoring means if the electric actuator is not energized. In this state, the steering handle or the steering wheel can be actuated or set in rotation by a driver in the usual way. On the other hand, the maximum braking torque that can be produced by the braking device is limited in such a way that the driver is able to overcome this by actuating the steering handle by hand, so that an intervention in the vehicle steering system by the driver remains possible at any time.

Furthermore, there is the possibility that the coupling device is urged into an engaged position under the action of a pre-loading means when in the non-operated state. Here, too, an electromagnetic actuator can be provided to actuate the coupling device, wherein when the electromagnetic actuator is not energized, the input and output shafts are co-rotationally coupled to each other. In other words, in the engaged position of the coupling device, the planetary gearing, and therefore ultimately the auxiliary steering device, is bypassed, so that the input and output shaft rotate synchronously with each other when the steering handle is actuated.

By the auxiliary steering device, interacting with the hydrostatic vehicle steering system, various auxiliary and additional functions can be implemented within the context of appropriate operating modes. For this purpose, the auxiliary steering device is equipped with an electronic control device.

First Emergency Operating Mode

In a first emergency operating mode, provided for a malfunction of the auxiliary steering device, there is the possibility that, under the control of the control device and with the braking device open, the coupling device is engaged and the electric drive is set into a drive-free state, in which the ring gear is allowed to rotate freely when the steering handle is actuated.

A malfunction of this type can occur for example, in the event of a defect or failure of the electric drive, of a power supply provided for its operation, of the rotary encoder, but also of the control device itself or a positioning or control loop comprised by the latter which is used to control the electric drive. Whether this is the case can be detected by the control device on the basis of a self-diagnosis and/or a plausibility check of the information exchange of the aforementioned components that is carried out via the CAN bus. The first emergency operating state here ensures that the driver can continue to exert an influence on the hydrostatic vehicle steering system by actuating the steering handle.

Second Emergency Operating Mode

On the other hand, in a second emergency operating mode, provided for a malfunction of the hydrostatic vehicle steering system, under the control of the control device and with the braking device open, the coupling device can be engaged and the electric drive can be set into a steering-assisting drive state, depending on an ascertained actuation of the steering handle.

The second emergency operating mode takes account of the circumstances in which, in the event of a defect, the hydrostatic vehicle steering system can if necessary still be actuated with a considerable expenditure of force via the steering handle. Conceivable, amongst other things, is a failure of the hydraulic high-pressure pump feeding the steering metering valve or orbitrol, wherein this can be detected for the control device on the basis of a corresponding error message on the CAN bus. In the case of the second emergency operating mode, while bypassing the planetary gearing, a steering actuation by the driver is therefore actively assisted by the electric drive.

Here, there is the possibility that the control device determines the direction and extent of the steering actuation by the driver from the current direction of rotation and position of the steering handle, detected by a rotary encoder. The steering input detected in this way is then converted into steering interventions corresponding thereto by activating the electric drive by the positioning or control loop comprised by the control device.

Neutral Operating Mode

Furthermore, provision can be made that, under the control of the control device in a neutral operating mode and with the braking device open, the coupling device is engaged and the electric drive is set into a drive state compensating for a retroactive effect of the auxiliary steering device on the steering handle. The neutral operating mode can be called up manually via a user interface communicating with the control device.

The neutral operating mode differs from the first emergency operating mode in that the breakaway and frictional torques in the drive-free state of the electric drive are reduced to such an extent that the actuating characteristics imparted by the steering handle largely correspond to those of a conventional hydrostatic vehicle steering system without an auxiliary steering device. Here, too, the steering interventions are implemented on the basis of the rotational angle information from the rotary encoder provided via the CAN bus.

Furthermore, further operating modes relating to active driver assistance can be provided. These can likewise be called up manually via the user interface communicating with the control device.

First Assistance Mode

Thus, in a first assistance mode, under the control of the control device and with the braking device open, the coupling device can be engaged and, by the electric drive, an actuating torque indicating a straight-ahead position of steerable wheels can be impressed on the steering handle.

This function leads to assisting or relieving the load on the driver, for example, when carrying out road transport journeys, since lane-keeping on straight sections is substantially simplified on the basis of the haptic feedback exerted via the steering handle.

Second Assistance Mode

In a second assistance mode, provision can be made that, under the control of the control device and with the braking device open, the coupling device is disengaged and the electric drive is activated with the effect of a change in the transmission ratio between the input and output shaft.

A typical application of the second assistance mode is the implementation of what is known as speed-sensitive steering, as is known from the automobile sector. For example, with increasing speed of travel of a vehicle equipped with the auxiliary steering device, a reduction in the transmission ratio, consequently an increasing step down, can be carried out. It is also conceivable to combine the first and second assistance modes with each other, which is recommended, for example, when carrying out road transport journeys. Information with regard to the current speed of travel of the vehicle is available to the control device on the CAN bus in the form of corresponding wheel rotational speed information or is derived from position information obtained by a satellite-assisted navigation system.

Automatic Mode

The automatic mode in the present case is distinguished by the fact that, under the control of the control device, the braking device is closed and the coupling device is disengaged, the electric drive being activated in accordance with a steering command predefined by an autonomous vehicle control system.

As a result of fixing the input shaft and therefore the planetary wheel carrier, the output shaft and therefore the steering metering valve or orbitrol are set in rotation exclusively by the electric drive.

The autonomous vehicle control system is, for example, a steering system as is offered by John Deere under the designation "AutoTrac". In addition to carrying out driver-independent steering interventions, this likewise provides an influence on the speed of travel. In order that the driver retains the power over the vehicle at any time, it can be imagined that the control device automatically ends the automatic mode when an actuation of the steering handle is detected and, for example, changes to the neutral operating mode. Whether there is an intended actuation of the steering handle can be detected without difficulty by the control device by evaluating the rotational angle information from the rotary encoder that is present on the CAN bus.

BRIEF DESCRIPTION OF THE DRAWINGS

The auxiliary steering device according to the disclosure for a hydrostatic vehicle steering system is explained in more detail below with reference to the appended drawings. Here, identical designations relate to corresponding components or components which are comparable with respect to their function. In the drawings:

FIG. 2 shows a tabular overview of the auxiliary and additional functions that can be executed by using the auxiliary steering device.

DETAILED DESCRIPTION

Figure 1:
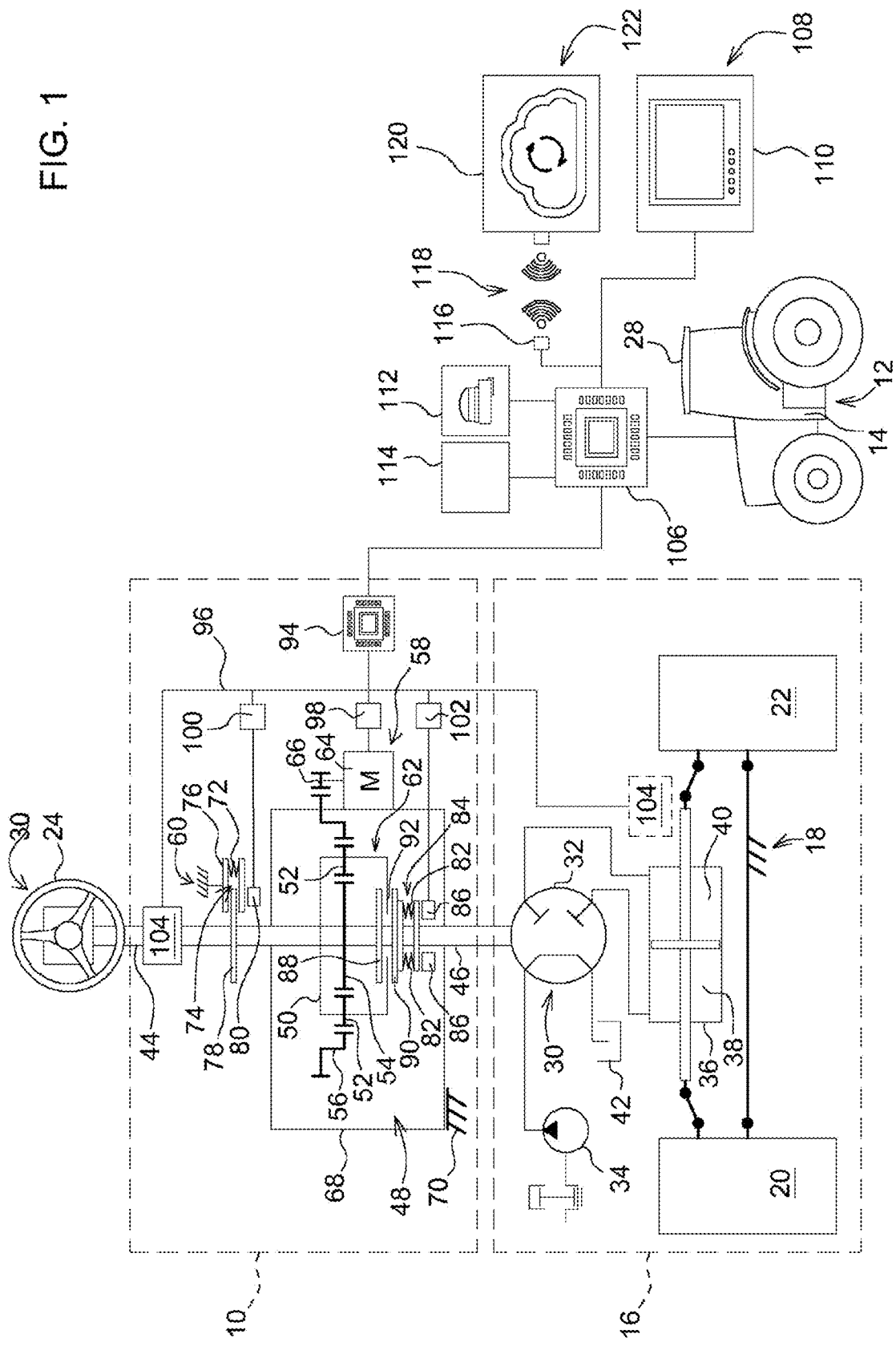
FIG. 1 shows a schematically illustrated example embodiment of the auxiliary steering device according to the disclosure.

FIG. 1 shows an example embodiment of the auxiliary steering device 10 according to the disclosure in an agricultural vehicle 12.

The agricultural vehicle 12 in the present case is an agricultural tractor 14 of conventional design. The agricultural tractor 14 is equipped with a hydrostatic or fully hydraulic vehicle steering system 16, by which the steering angle of steerable wheels 20, 22 arranged on a front axle 18 can be adjusted. More specifically, the hydrostatic vehicle steering system 16 comprises a steering handle 26 designed as a steering wheel 24 in a driver's cab 28 of the agricultural tractor 14, a steering metering valve 30 in the form of an orbitrol 32, which can be actuated by the steering wheel 24 and is supplied with pressurized hydraulic fluid from a hydraulic high-pressure pump 34, and a hydraulic steering cylinder 36 which is connected to the orbitrol 32 and which can be activated by the orbitrol 32 for the purpose of adjusting the steerable wheels 20, 22. Depending on the direction of rotation of the orbitrol 32, the steering cylinder 36 is deflected either to one side or to the other, the extent of the deflection being given by the respective angular position of the orbitrol 32, more precisely the hydraulic volume proportional thereto which is delivered by the orbitrol 32 in the direction of the steering cylinder 36. In the present case, the steering cylinder 36 is designed to be double-acting, so that hydraulic fluid flows into one of the two working chambers 38, 40 and out of the other in the direction of a hydraulic reservoir 42, depending on the direction of rotation of the orbitrol 32.

Starting from the illustration in FIG. 1, the auxiliary steering device 10 is located in the mechanical connection running between the steering wheel 24 and the orbitrol 32, for which purpose the auxiliary steering device 10 has on the input side an input shaft 44 that can be actuated and set in rotation by the steering wheel 24 and, on the output side, an output shaft 46 for actuating the orbitrol 32. The steering wheel 24 and input shaft 44, on the one hand, and the output shaft 46 and orbitrol 32, on the other hand, are each connected to each other for conjoint rotation.

An important constituent part of the auxiliary steering device 10 is planetary gearing 48. The planetary gearing 48 comprises a planetary wheel carrier 50 with multiple planetary wheels 52, which mesh with a sun gear 54 and a surrounding ring gear 56, the input shaft 44 being connected to the planetary wheel carrier 50 and the output shaft 46 being connected to the sun gear 54, in each case for conjoint rotation.

Furthermore, the auxiliary steering device 10 has an electric drive 58 for exerting a torque on the ring gear 56, a braking device 60 for fixing the input shaft 44, and a coupling device 62 for producing a rotationally fixed connection between the output shaft 46 and the planetary wheel carrier 50.

The electric drive 58 is designed as a geared electric motor 64 and is in drive engagement with the ring gear 56 of the planetary gearing 48 via a spur gear 66 on the output side. The geared electric motor 64, as well as the braking device 60 described below, is mounted on a fixing structure 68 of the auxiliary steering device 10, which is used for the attachment to a chassis part 70 fixed to the vehicle, indicated in FIG. 1.

In the non-actuated state, the braking device 60 is urged into an open position under the action of a restoring means 74 designed as a compression spring 72. The actuation of the braking device 60, in the present case a brake calliper 76 for gripping a brake disk 78 co-rotationally connected to the input shaft 44, is carried out by an electromagnetic actuator 80. The braking device 60 assumes its open position under the action of the restoring means 74 if the electromagnetic actuator 80 is not energized. In this state, the steering wheel 24 can be set in rotation by the driver in the usual way. On the other hand, the maximum braking torque that can be produced by the braking device 60 is limited in such a way that the driver is capable of overcoming this by hand by actuating the steering wheel 24, so that an intervention in the vehicle steering system 16 by the driver remains possible at any time.

On the other hand, in the non-actuated state the coupling device 62 is urged into an engaged position under the action of a pre-loading means 84 formed by two compression springs 82. To actuate the coupling device 62, a further electromagnetic actuator 86 is provided, the input and output shaft 44, 46 being co-rotationally coupled to each other if the electromagnetic actuator 86 is not energized. In other words, when the coupling device 62 is in the engaged position, the planetary gearing 48, and therefore ultimately the auxiliary steering device 10, is bypassed, so that the input and output shaft 44, 46 rotate synchronously with each other when the steering wheel 24 is rotated. Here, the coupling device 62 according to FIG. 1 has a first coupling disk 88 co-rotationally connected to the output shaft 46, which causes a second coupling disk 90 co-rotationally connected to the output shaft 46 to be deflected, in order to engage with a collar 92 running on the planetary wheel carrier 50.

To coordinate the electric drive 58 and the two electromagnetic actuators 80, 86, use is made of an electronic control device 94 (e.g., a controller including a processor and memory) associated with the auxiliary control device 10. This communicates via a CAN bus 96 of the agricultural tractor 14 with a motor control system 98 provided to operate the electric drive 58 and first and second circuit breakers 100, 102, which permit mutually independent activation of the two electromagnetic actuators 80, 86. In addition, there is a rotary encoder 104 for the sensor-based detection of the steering wheel position, the rotational angle information from which is provided to the control device 94 via the CAN bus 96. The rotary encoder 104 is, for example, arranged in the area of the input shaft 44 in order to detect the current direction of rotation and position of the latter. Alternatively, the rotary encoder 104 is located in the area of the steering cylinder 36.

As can be seen from FIG. 1, the control device 94 is also connected to a central vehicle control device 106 which, for its part, communicates with a user interface 108 in the form of a touch-sensitive display 110, a satellite-assisted navigation system 112, an autonomous vehicle control system 114, and a data transmission interface 116, which are used to produce a wire-free data exchange connection 118 to a farm management system 120 on a central cloud server 122.

By using the auxiliary steering device 10, various auxiliary and additional functions are executed within the context of corresponding operating modes. FIG. 2 gives a tabular overview.

First Emergency Operating Mode

In a first emergency operating mode provided for a malfunction of the auxiliary steering device 10, under the control of the control device 94 and with the braking device 60 open, the coupling device 62 is engaged by activating the associated electric actuator 86, and the electric drive 58 is set into a drive-free state, in which the ring gear 56 can be rotated freely when the steering wheel 24 is actuated.

Such a malfunction can occur, for example, in the event of a defect or failure of the electric drive 58, of a power supply provided to operate the latter, of the rotary encoder 104, but also of the control device 94 itself, or a positioning or control loop comprised by the latter, which is used to control the electric drive 58. Whether this is the case is detected by the control device 94 on the basis of a self-diagnosis and/or a plausibility check of the information exchange of the aforementioned components that is carried out via the CAN bus 96. Here, the first emergency operating state ensures that the driver can continue to exert an influence on the hydrostatic vehicle steering system 16 by actuating the steering wheel 24.

Second Emergency Operating Mode

On the other hand, in a second emergency operating mode provided for a malfunction of the hydrostatic vehicle steering system 16, under the control of the control device 94 and with the braking device 60 open, the coupling device 62 is engaged and the electric drive 58 is set into a steering-assisting drive state depending on a determined actuation of the steering wheel 24.

The second emergency operating mode takes account of the circumstances in which, in the event of a defect, the hydrostatic vehicle steering system 16 can if necessary still be actuated with a considerable expenditure of force via the steering wheel 24. Conceivable, amongst other things, is a failure of the hydraulic high-pressure pump 34 feeding the steering metering valve 30 or orbitrol 32, wherein this can be detected for the control device 94 on the basis of a corresponding error message on the CAN bus 96. In the case of the second emergency operating mode, while bypassing the planetary gearing 48, a steering actuation by the driver is therefore actively assisted by the electric drive 58.

The direction and extent of the steering actuation by the driver are derived by the control device 94 from the current direction of rotation and position detected on the steering wheel 24 via the input shaft 44 by the rotary encoder 104. The steering input detected in this way is then converted into steering interventions corresponding thereto by activating the electric drive 58 by the positioning or control loop comprised by the control device 94.

Neutral Operating Mode

Furthermore, a neutral operating mode is provided, in which, under the control of the control device 94 and with the braking device 60 open, the coupling device 62 is engaged and the electric drive 58 is set into a drive state compensating for a retroactive effect of the auxiliary steering device 10 on the steering wheel 24. The neutral operating mode is called up manually via the user interface 108 communicating with the control device 94.

The neutral operating mode differs from the first emergency operating mode in that the breakaway and frictional torques in the drive-free state of the electric drive 58 are reduced to such an extent that the actuating characteristics imparted via the steering wheel 24 largely correspond to those of a conventional hydrostatic vehicle steering system without an auxiliary steering device 10. Here, too, the steering interventions are implemented on the basis of the rotational angle information from the rotary encoder 104, provided via the CAN bus 96, with regard to the current direction of rotation and position of the steering wheel 24, detected via the input shaft 44.

Moreover, further operating modes relating to the active driver assistance are provided. These can likewise be called up manually via the user interface 108 communicating with the control device 94.

First Assistance Mode

Thus, when a first assistance mode is selected by the driver, under the control of the control device 94 and with the braking device 60 open, the coupling device 62 is engaged and, by the electric drive 58, an actuating moment indicating a straight-ahead position of the steerable wheels 20, 22 is impressed on the steering wheel 24.

This function leads to assisting or relieving the load on the driver, for example, when carrying out road transport journeys, since lane-keeping on straight sections is substantially simplified on the basis of the haptic feedback exerted via the steering wheel 24.

Second Assistance Mode

Alternatively or additionally, a second assistance mode can be selected by the driver. In this mode, under the control of the control device 94 and with the braking device 60 open, the coupling device 62 is disengaged and the electric drive 58 is activated with the effect of changing the transmission ratio between the input and output shaft 44, 46.

The second assistance mode is used to implement what is known as speed-sensitive steering, as is known from the automobile sector. For example, with increasing speed of travel of the agricultural tractor 14, a reduction in the transmission ratio, consequently an increasing step down, can be carried out. Information with regard to the current speed of travel of the agricultural tractor 14 is available to the control device 94 in the form of corresponding wheel rotational speed information on the CAN bus 96 or is derived from the position information obtained by the satellite-assisted navigation system 112.

Automatic Mode

Furthermore, an automatic mode can be selected by the driver, in which, under the control of the control device 94, the braking device 60 is closed and the coupling device 62 is disengaged, the electric drive 58 being activated on the basis of a steering command predefined by the autonomous vehicle control system 114.

As a result of fixing the input shaft 44 and therefore the planetary wheel carrier 50, the output shaft 46 and therefore the steering metering valve 30 or orbitrol 32 are set in rotation exclusively by the electric drive 58.

The autonomous vehicle control system 114 is a steering system as offered by John Deere under the designation "AutoTrac". In addition to carrying out driver-independent steering interventions, this likewise provides an influence on the speed of travel. The planning of the route to be travelled autonomously is carried out by the farm management system 120, wherein the associated control data is called up via the data transmission interface 116 and uploaded into the steering system of the autonomous vehicle control system 114.

In order that the driver retains the power over the agricultural tractor 14 at any time, the control device 94 automatically ends the automatic mode when an actuation of the steering wheel 24 is detected, in order to change to the neutral operating mode. Whether there is an intended actuation of the steering wheel 24 is detected by the control device 94 by evaluating the rotational angle information from the rotary encoder 104 that is present on the CAN bus 96.

The invention claimed is:

1. An auxiliary steering device for a hydrostatic vehicle steering system, comprising:
an input shaft which can be actuated by a steering handle, an output shaft for actuating a steering metering valve, and a planetary gearing including a planetary wheel carrier with multiple planetary wheels, which mesh with a sun gear and a surrounding ring gear, wherein the input shaft is connected to the planetary wheel carrier and the output shaft is connected to the sun gear, in each case for conjoint rotation, and wherein the auxiliary steering device further has an electric drive for exerting a torque on the ring gear, a braking device for fixing the input shaft, and a coupling device for producing a rotationally fixed connection between the output shaft and the planetary wheel carrier.

2. The auxiliary steering device of claim 1, wherein the braking device is urged into an open position under the action of a first spring when in the non-actuated state.

3. The auxiliary steering device of claim 2, wherein the coupling device is urged into an engaged position under the action of a second spring when in the non-actuated state.

4. The auxiliary steering device of claim 1, wherein the coupling device is urged into an engaged position under the action of a second spring when in the non-actuated state.

5. The auxiliary steering device of claim 1, wherein a control device, under the control of which, in a first emergency operating mode provided for a malfunction of the auxiliary steering device and with the braking device open, the coupling device is engaged and the electric drive is set into a drive-free state, in which the ring gear is allowed to rotate freely when the steering handle is actuated.

6. The auxiliary steering device of claim 1, wherein a control device, under the control of which, in a second emergency operating mode provided for a malfunction of the hydrostatic vehicle steering device and with the braking device open, the coupling device is engaged and the electric drive is set into a steering-assisting drive state, depending on an ascertained actuation of the steering handle.

7. The auxiliary steering device of claim 6, wherein the control device determines the direction and extent of the steering actuation from a current direction of rotation and position of the steering handle, detected by a rotary encoder.

8. The auxiliary steering device of claim 1, wherein a control device, under the control of which, in a neutral operating mode and with the braking device open, the coupling device is engaged and the electric drive is set into a drive state compensating for a retroactive effect of the auxiliary steering device on the steering handle.

9. The auxiliary steering device of claim 1, wherein a control device, under the control of which, in a first assistance mode with the braking device open, the coupling device is engaged and, by the electric drive, an actuating torque indicating a straight-ahead position of steerable wheels is impressed on the steering handle.

10. The auxiliary steering device of claim 9, wherein the control device combines the first and second assistance modes with each other.

11. The auxiliary steering device of claim 1, wherein a control device, under the control of which, in a second assistance mode with the braking device open, the coupling device is disengaged, and the electric drive is activated with the effect of changing the transmission ratio between the input and output shaft.

12. The auxiliary steering device of claim 1, wherein a control device (94), under the control of which, in an automatic mode, the braking device is closed and the coupling device is disengaged, the electric drive being activated on the basis of a steering command predefined by an autonomous vehicle control system.

\* \* \* \* \*